May 5, 1925.

J. A. ROBERTSON 1,536,143

TRIPOD CONNECTION FOR CAMERAS

Filed Aug. 16, 1922

INVENTOR.
John A. Robertson
BY
his ATTORNEY

Patented May 5, 1925.

1,536,143

UNITED STATES PATENT OFFICE.

JOHN A. ROBERTSON, OF ROCHESTER, NEW YORK, ASSIGNOR TO EASTMAN KODAK COMPANY, OF ROCHESTER, NEW YORK, A CORPORATION OF NEW YORK.

TRIPOD CONNECTION FOR CAMERAS.

Application filed August 16, 1922. Serial No. 582,119.

*To all whom it may concern:*

Be it known that I, JOHN A. ROBERTSON, a citizen of the United States, residing at Rochester, in the county of Monroe, State of New York, have invented certain new and useful Improvements in Tripod Connections for Cameras, of which the following is a specification.

My present invention relates to photography and more particularly to photographic cameras and has for its object to improve fitting on a camera body or bed by means of which the camera is attached to a tripod or similar support. Such fitting usually consists of a threaded nut into which a bolt on the tripod is screwed and my invention has for its object to so protect this nut as to prevent the entrance of dust and dirt therethrough into the interior of the instrument while at the same time interfering in no way with the convenience of attachment of the tripod bolt. To these and other ends the invention consists in certain improvements and combination of parts all as will be hereinafter more fully described, the novel features being pointed out in the claims at the end of the specification.

In the drawings.

Similar reference numerals throughout the several views indicate the same parts.

Figure 1:
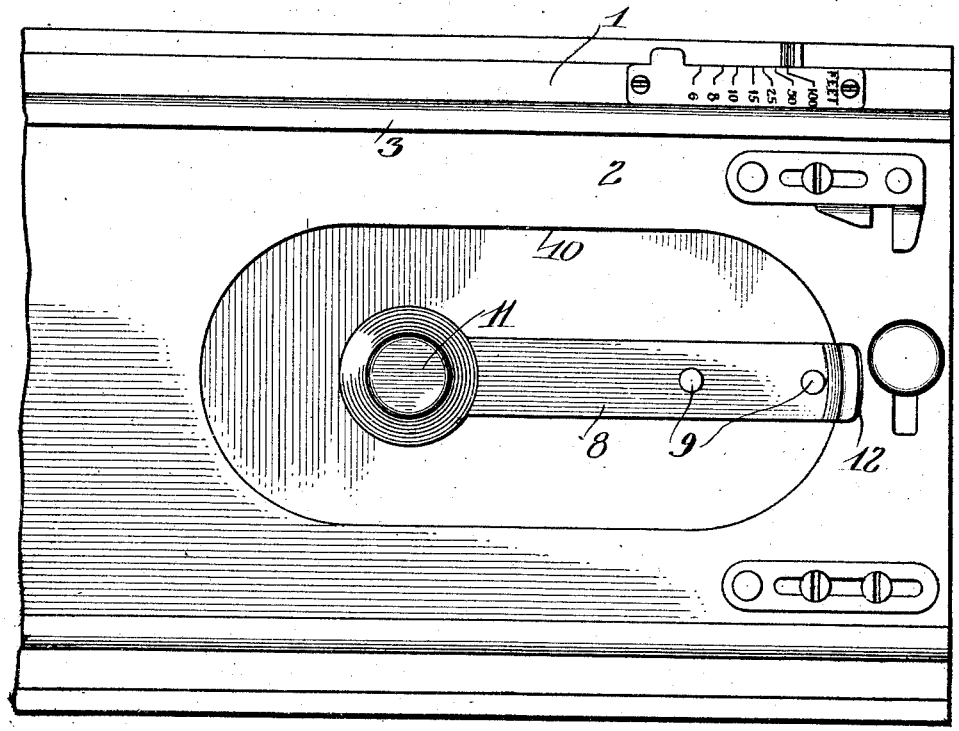
Figure 1 is a plan view of a camera bed provided with a tripod fitting constructed in accordance with and constituting one embodiment of my invention.

The camera bed in connection with which I have illustrated my invention in its present embodiment is the folding bed of the ordinary pocket or hand camera and while a tripod connection is ordinarily provided on both the bed and the body of the camera my improvements are applicable in both instances and a description of one will suffice for both.

Referring more particularly to the drawings, 1 indicates the main bed plate of the camera and 2 the extension bed slidable thereon in suitable guides and upon which the lens carriage in turn slide on the ways 3. The usual leather or similar covering for the camera bed and body is indicated at 4.

A tripod nut 5 having a central threaded aperture 6 extending through from side to side thereof is suitably riveted to or spun down upon the margins of an opening in the bed plate 1 which the nut occupies the plate being seized between two shoulders 7 on the periphery of the nut which is preferably cylindrical. In practice the camera is secured to the tripod by drawing it down upon the tripod table with a bolt rotatably secured in the table and cooperating with the nut.

Figure 2:
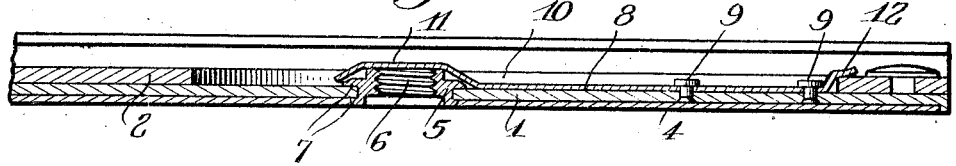
Figure 2 is a central section therethrough.

This threaded nut thus forms a permanent opening through the bed which it is desirable to close and in the practice of my invention I provide a closure in the present form of a leaf spring 8 which is a flat ribbon of material lying close against the bed plate as shown and suitably secured thereto at one end as by the rivets 9. The spring occupies an opening 10 in the extension bed 2 as does the nut 5 whereby these parts do not interfere with the relative movements of the two beds. At the opposite end the spring is enlarged to form a shallow concave or dished circular cap 11 that is offset relatively to the body of the spring and fits over the open inner end of the nut 5, normally in the matter shown in Figure 2. The securing devices 9 for the spring are at a point remote from the cap so that the latter may yield upwardly from pressure within the nut but will automatically reassume closed position when such pressure is removed. The interior of the camera is thus protected at all times and the bed is rendered more sightly from above.

In practice, when the camera is applied to a tripod and the bolt inserted in the nut, if the bolt be longer than the nut so as to project through the cap 11 will yield upwardly to accommodate it and then close again when the bolt is removed. These bolts are not of uniform length which makes it desirable from that standpoint of having the threaded aperture in the nut extend through from side to side.

If desired the spring 8 may be formed with a raised lip 12 at its end acting as a stop for limiting the rearward movement of the extension bed 2 as shown in the present instance.

I claim as my invention:

1. The combination with a relatively thin support having a nut rigidly held therein provided with a threaded aperture extending from side to side of the support, of a yielding closure for the upper side of the nut adapted to be displaced by a screw extending therethrough.

2. The combination with a relatively thin support having a nut rigidly held therein provided with a threaded aperture extending from side to side of the support, the top of the nut being raised above the upper surface of the latter, of a yielding closure for the upper side of the nut adapted to be displaced by a screw extending therethrough, said closure consisting of a leaf spring lying close against the support and fastened thereto at a point remote from the nut and terminating in an offset cap covering the nut.

JOHN A. ROBERTSON.